US009080608B2

(12) United States Patent
Lund et al.

(10) Patent No.: US 9,080,608 B2
(45) Date of Patent: Jul. 14, 2015

(54) FLASH-BUTT WELDED BEARING COMPONENT

(75) Inventors: Thore Lund, Gothenburg (SE); Viktor Recina, Torslanda (SE)

(73) Assignee: AKTIEBOLAGET SKF, Gothenburg (SE)

( * ) Notice: Subject to any disclaimer, the term of this patent is extended or adjusted under 35 U.S.C. 154(b) by 149 days.

(21) Appl. No.: 13/808,022

(22) PCT Filed: May 27, 2011

(86) PCT No.: PCT/SE2011/000100
§ 371 (c)(1),
(2), (4) Date: Mar. 14, 2013

(87) PCT Pub. No.: WO2012/002869
PCT Pub. Date: Jan. 5, 2012

(65) Prior Publication Data
US 2013/0216170 A1 Aug. 22, 2013

(30) Foreign Application Priority Data
Jul. 2, 2010 (SE) ...................................... 1000721

(51) Int. Cl.
| | |
|---|---|
| *F16C 33/30* | (2006.01) |
| *F16C 19/00* | (2006.01) |
| *B23K 33/00* | (2006.01) |
| *B23K 11/04* | (2006.01) |
| *C22C 38/02* | (2006.01) |
| *C22C 38/04* | (2006.01) |
| *C22C 38/22* | (2006.01) |
| *F16C 33/62* | (2006.01) |
| *F16C 33/12* | (2006.01) |
| *F16C 33/64* | (2006.01) |
| *B21C 37/08* | (2006.01) |

(52) U.S. Cl.
CPC ................ *F16C 33/30* (2013.01); *B23K 11/04* (2013.01); *C22C 38/02* (2013.01); *C22C 38/04* (2013.01); *C22C 38/22* (2013.01); *F16C 19/00* (2013.01); *F16C 33/121* (2013.01); *F16C 33/62* (2013.01); *F16C 33/64* (2013.01); *B21C 37/0826* (2013.01); *B23K 2203/04* (2013.01); *F16C 2226/36* (2013.01); *Y10T 403/477* (2015.01)

(58) Field of Classification Search
USPC ......... 384/445, 492, 499, 502, 548, 912, 913; 148/318, 319, 325, 334, 589, 516; 228/5.7, 101, 141.1, 151, 251
See application file for complete search history.

(56) References Cited

U.S. PATENT DOCUMENTS

| | | | | |
|---|---|---|---|---|
| 2,120,316 | A | * 6/1938 | Stone | 228/5.7 |
| 3,198,081 | A | * 8/1965 | Seeloff et al. | 409/300 |
| 4,930,909 | A | * 6/1990 | Murakami et al. | 384/492 |

(Continued)

FOREIGN PATENT DOCUMENTS

| | | |
|---|---|---|
| EP | 1094124 A2 | 4/2001 |
| EP | 1354971 A1 | 10/2003 |

(Continued)

*Primary Examiner* — Marcus Charles
(74) *Attorney, Agent, or Firm* — Bryan Peckjian; SKF USA Inc. Patent Dept.

(57) ABSTRACT

Bearing component (10) comprising steel and at least one flash butt weld joint. The steel comprises, by weight, max 20 ppm S and max 15 ppm O and in that said steel includes sulphide inclusions and less than 5% of the sulphide inclusions contain encapsulated or embedded oxide inclusions.

20 Claims, 3 Drawing Sheets

(56) References Cited

U.S. PATENT DOCUMENTS

| | | | |
|---|---|---|---|
| 6,719,854 B2 * | 4/2004 | Komori et al. | 148/325 |
| 6,837,946 B2 * | 1/2005 | Beswick et al. | 384/912 |
| 2006/0016858 A1 * | 1/2006 | Statnikov et al. | 228/101 |

FOREIGN PATENT DOCUMENTS

| | | | | |
|---|---|---|---|---|
| GB | 1141901 A | 2/1969 | | |
| GB | 2155951 A | 10/1985 | | |
| JP | H01234619 A | 9/1989 | | |
| JP | 2267220 A * | 11/1990 | | C21D 8/02 |
| JP | 2003034847 A | 2/2003 | | |
| JP | 2003035656 A | 2/2003 | | |
| JP | 2004183839 A | 7/2004 | | |
| SU | 1815072 A1 * | 5/1993 | | B23K 11/04 |
| WO | WO2006103021 A2 | 10/2006 | | |

* cited by examiner

FLASH-BUTT WELDED BEARING COMPONENT

CROSS-REFERENCE TO RELATED APPLICATION

This application is a National Stage application claiming the benefit of International Application Number PCT/SE2011/000100 filed on 27 May 2011, which claims the benefit of SE Application 1000721-9 Filed on 2 Jul. 2010.

TECHNICAL FIELD

The present invention concerns a bearing component, i.e. a component that constitutes at least part of one of the following: a ball bearing, a roller bearing, a needle bearing, a tapered roller bearing, a spherical roller bearing, a toroidal roller bearing, a ball thrust bearing, a roller thrust bearing, a tapered roller thrust bearing, a wheel bearing, a hub bearing unit, a slewing bearing, a ball screw, or a component for an application in which is subjected to alternating Hertzian stresses, such as rolling contact or combined rolling and sliding.

BACKGROUND OF THE INVENTION

Flash-butt welding or "flash welding" is a resistance welding technique for joining segments of metal rail, rod, chain or pipe in which the segments are aligned end to end and heated by electrical currents, producing an electric arc that melts and welds the ends of the segments, yielding an exceptionally strong and smooth joint.

A flash butt welding circuit usually consists of a low-voltage, high-current energy source (usually a welding transformer) and two clamping electrodes. The two segments that are to be welded are clamped in the electrodes and brought together until they meet, making light contact. Energizing the transformer causes a high-density current to flow through the areas that are in contact with each other. Flashing starts, and the segments are forged together with sufficient force and speed to maintain a flashing action. After a heat gradient has been established on the two edges to be welded, an upset force is applied to complete the weld. This upset force extrudes slag, oxides and molten metal from the weld zone leaving a welding accretion in the colder zone of the heated metal. The joint is then allowed to cool slightly before the clamps are opened to release the welded article. The welding accretion may be left in place or removed by shearing while the welded article is still hot or by grinding, depending on the requirements.

International publication no. WO 2006/103021 discloses a welded roller bearing ring made from a cold-rolled profile wire of roller bearing steel having a hypereutectic composition and a carbon content of at least 0.7%. The welded roller bearing ring comprises a soft-annealed coarse-grained nodular cementite joint obtained by butt welding. The region around the welded joint comprises a martensitic cementite structure with a higher carbide number and a finer structure relative to the remaining ring region. During the flash butt welding process, when two surfaces are forged together, a material flow perpendicular to the plane of the two surfaces is created. This material flow forms a grain structure or fibre flow oriented perpendicular to the plane of the two surfaces. Inclusions present within the material become incorporated in this material flow.

In conventional bearing steels, the dominating inclusion type is sulphides due to the fact that the sulphur content normally is higher than the oxygen content. Since sulphides have an elongated shape they can become highly oriented during flash butt welding and thus make the steel anisotropic in the area of the weld joint. It has been found that the life time of a bearing component is most adversely affected by oxygen-containing inclusions, such as sulphide inclusions containing encapsulated or embedded oxide inclusions, since when such inclusions have matrix contact, they act as crack initiators. When a component such as a bearing ring is being flash butt welded, the resulting fibre flow carrying incorporated sulphides will therefore be unfavourable with respect to fatigue crack initiation and propagation in the finished welded bearing ring compared to a bearing that does not comprise a flash butt weld joint. In addition, the sulphides in bearing steels can be fully or partially dissolved in austenite in the weld zone. On cooling, the sulphides will preferentially precipitate at grain boundaries which will significantly weaken the weld zone.

In order to avoid these problems with sulphides during flash butt welding it is not advantageous to reduce the sulphur content of the bearing steel to as close to zero as possible since this results in magnesium and calcium in the melt entering oxide inclusions in the form of aluminates and forming undesired complex aluminate inclusions. Pure aluminates are hard and brittle; they will break during hot forming and do not therefore pose a substantial problem to manufacturers of bearing components with high degrees of forming deformation. However, complex aluminates can be hard but they are not brittle so they will remain intact during rolling and will therefore be incorporated into the finished bearing component. If a complex aluminate inclusion becomes located in an area of the bearing component subject to heavy loading, this is where a fatigue failure will start.

SUMMARY OF THE INVENTION

An object of the invention is to provide a bearing component comprising at least one flash butt weld joint which has improved fatigue properties.

The object of the invention is achieved by a bearing component comprising steel that contains, by weight, max 20 ppm S and max 15 ppm O and includes sulphide inclusions whereby less than 5% of the sulphide inclusions contain encapsulated or embedded oxide inclusions.

It has been found that the adverse effects of the unfavourable fibre flow that flash butt welding creates may be limited by manufacturing bearing components that are to be flash butt welded out of such steel. Using such a clean steel namely provides a welded bearing component having a superior weld joint since the welded bearing component does not contain areas of structural weakness as might otherwise occur. Such a welded bearing component therefore has a high degree of structural integrity compared to flash butt welded bearing ring that does not comprise such steel.

According to another embodiment of the invention the steel comprises max 10 ppm O or max 8 ppm O.

According to an embodiment of the invention the steel contains between 0.10 to 1.20 weight-% C. According to another embodiment of the invention the steel contains between 0.15 to 0.40 weight-% C. The steel may for example be of ASTM A295 / A295M-09 type, such ISO 683-17:1999 ASTM A-295-98, or any other high-carbon through-hardened steel that is suitable for an application in which it is subjected to alternating Hertzian stresses, such as rolling contact or combined rolling and sliding.

According to another embodiment of the invention the steel comprises an element selected from the group: Ca, Mg, Te or a lanthanide, such as Ce, Pr, Nd, Pm, Sm, Eu, Gd, Tb, Dy, Ho, Er, Tm, Yb or Lu. According to a further embodiment of the invention the steel comprises, by weight, 10-30 ppm of an element selected from the group above.

The addition of such an element to bearing steel (i.e. steel suitable for use in a bearing component) after the sulphur content has been reduced to a level substantially of the same order as the oxygen content, will reduce the total number of sulphide inclusions remaining in the steel and/or it will modify the shape of the remaining inclusions into one that is less detrimental to mechanical properties in the final bearing component, (tellurium for example spherodizes the sulphide inclusions). It has namely been found that the addition of such an element to bearing steel will result in less than 5% of the sulphide inclusions containing encapsulated or embedded oxide inclusions. The addition of such an element will also result in all of the sulphide inclusions having an aspect ratio of less than 3:1 (i.e. the ratio of the inclusion's largest diameter to the inclusion's shortest diameter) and in the maximum sulphide inclusion length being 125μm (micrometers) at a Reduced Variate equal to 3 evaluated using the ASTM E2283-03 Extreme Value Analysis Standard. Such sulphide inclusions are less damaging to a bearing component as regards its fatigue properties. Furthermore, the absence of sulphide inclusions having an aspect ratio greater than 3:1 and having a maximum length greater than 125 μm (micrometers) gives the steel more uniform properties in all directions and thereby reduces directional anisotropy in the steel.

According to an embodiment of the invention the bearing component constitutes at least part of one of the following: a ball bearing, a roller bearing, a needle bearing, a tapered roller bearing, a spherical roller bearing, a toroidal roller bearing, a ball thrust bearing, a roller thrust bearing, a tapered roller thrust bearing, a wheel bearing, a hub bearing unit, a slewing bearing, a ball screw, or a component for an application in which is subjected to alternating Hertzian stresses, such as rolling contact or combined rolling and sliding.

According to another embodiment of the invention the bearing component constitutes a bearing ring or a bearing ring segment, two or more of which may be welded into a bearing ring.

BRIEF DESCRIPTION OF THE DRAWINGS

The present invention will hereinafter be further explained by means of non-limiting examples with reference to the appended schematic figures in which.

Figure 1:
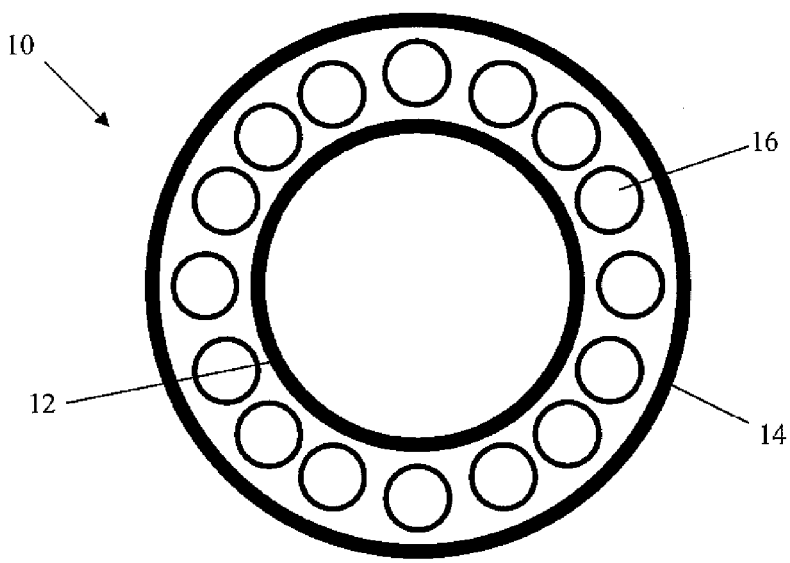
FIG. 1 schematically shows a bearing component according to an embodiment of the invention.

It should be noted that the drawing has not been drawn to scale and that the dimensions of certain features have been exaggerated for the sake of clarity.

DETAILED DESCRIPTION OF EMBODIMENTS

FIG. 1 schematically shows an example of a bearing component 10, namely a rolling element bearing that may range in size from 10 mm diameter to a few metres diameter and have a load-carrying capacity from a few tens of grams to many thousands of tonnes. The bearing component according to the present invention may namely be of any size and have any load-carrying capacity. The bearing component 10 has an inner ring 12, an outer ring 14 and a set of rolling elements 16. The inner ring 12, the outer ring 14 and/or the rolling elements 16 of the rolling element bearing 10, and preferably all of the rolling contact parts of the rolling element bearing 10 are manufactured from steel that comprises, by weight, max 20 ppm S and max 15ppm O, preferably max 20 ppm S and max 8 ppm O. Less than 5% of the sulphide inclusions contained in the steel contain encapsulated or embedded oxide inclusions. All of the sulphide inclusions have an aspect ratio less than 3:1 and the maximum length of the sulphide inclusions is 125 μm (micrometers) at a Reduced Variate equal to 3 (determined using ASTM E2283-03 Extreme Value Analysis).

The steel from which at least part of the rolling element bearing 10 is manufactured may for example contain between 0.70 to 1.20% carbon. For example the steel may have the following composition:

0.70-0.95 weight-% carbon
0.05-1.5 weight-% silicon
0.15-0.50 weight-% manganese
0.5-2.5 weight-% chromium
0.10-1.5 weight-% molybdenum
max. 0.25 weight-% vanadium, alone or in combination with niobium
the remainder being Fe, and normally occurring impurities comprising 10-30 ppm Ca, max 20 ppm S and max 15 ppm O, preferably max 10 ppm O or most preferably max 8 ppm O.

Figure 2:
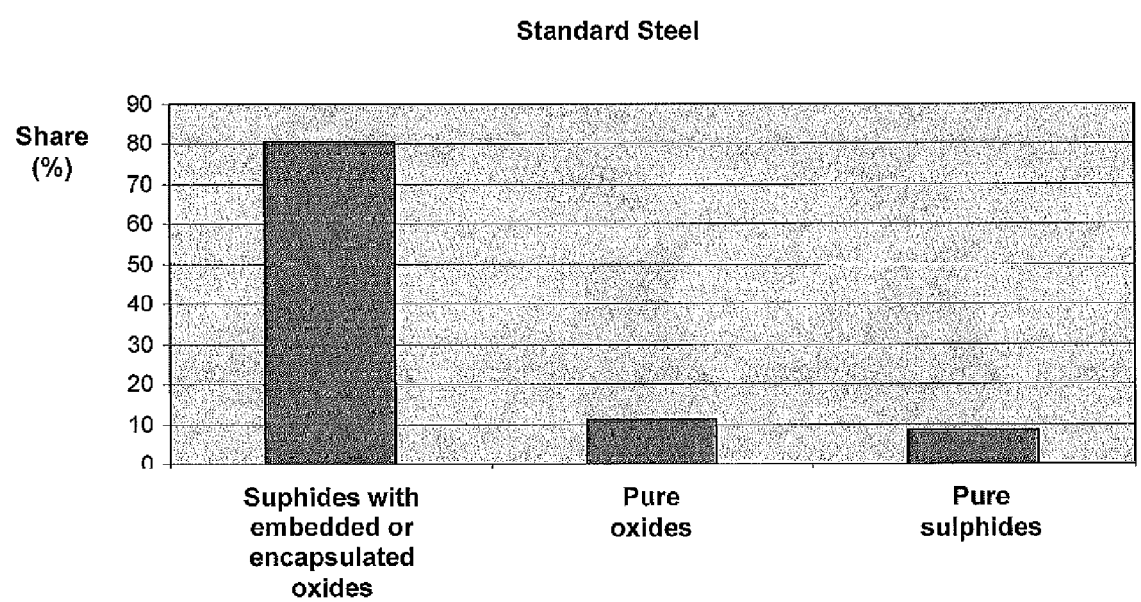
FIG. 2 shows the percentage of sulphide inclusions containing encapsulated or embedded oxide inclusions in standard steel.
Figure 3:
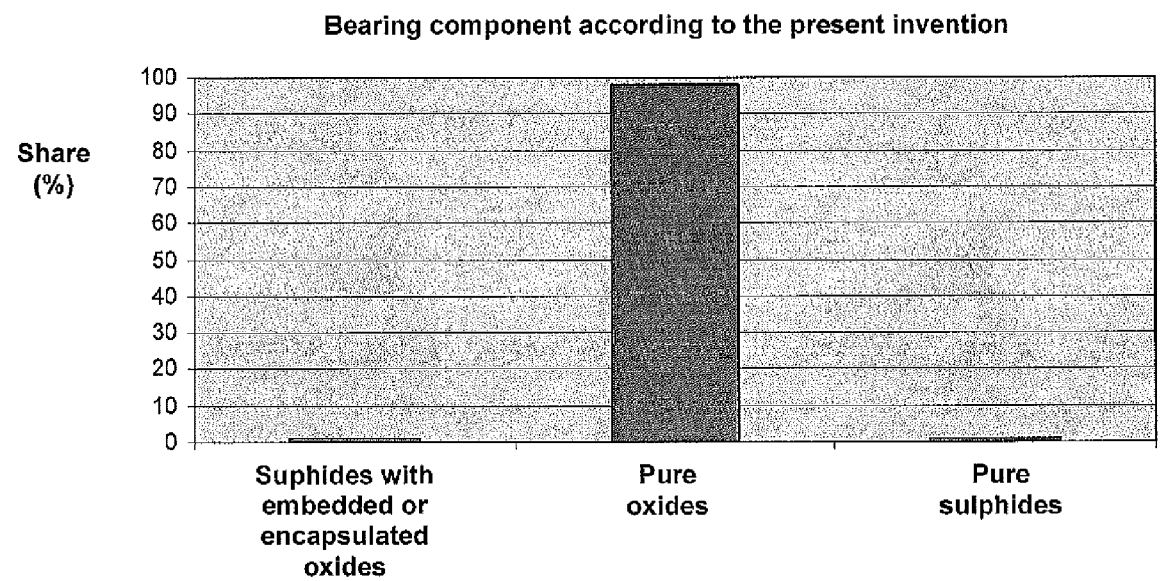
FIG. 3 shows the percentage of sulphide inclusions containing encapsulated or embedded oxide inclusions in the steel of a bearing component according to the present invention.

FIGS. 2 and 3 show the percentage of sulphide inclusions containing encapsulated or embedded oxide inclusions in standard steel, and in the steel of a bearing component according to the present invention respectively. It can be seen that only about 1% of the sulphide inclusions of the steel of a bearing component according to the present invention contain encapsulated or embedded oxide inclusions. On the contrary, in standard steel, about 80% of the steel's sulphide inclusions contain encapsulated or embedded oxide inclusions. It has been found that the fatigue strength (measured in rotating beam tests at 950 MPa) of the steel of a bearing component according to the present invention is substantially higher than the fatigue strength of standard steel.

Figure 4:
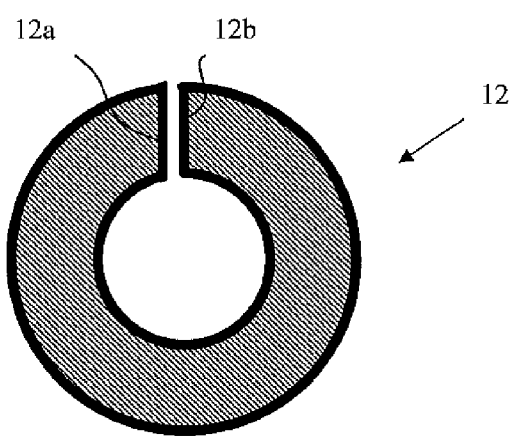
FIG. 4 shows a bearing ring according to an embodiment of the invention prior to flash butt welding.

FIG. 4 shows an open bearing ring 12, such as the inner ring of a roller bearing, prior to being flash butt welded. The bearing ring 12 is manufactured from steel comprising, by weight, max 20 ppm S and max 15 ppm O and including sulphide inclusions whereby less than 5% of the sulphide inclusions contain encapsulated or embedded oxide inclusions.

The open bearing ring 12 in the illustrated embodiment comprises two ends 12a, 12b that are to be welded together by flash butt welding to form a flash butt weld joint. It should be noted that such a bearing ring 12 may comprise two or more bearing ring segments whose ends are welded together by flash butt welding to form a bearing ring comprising a plurality of flash butt weld joints.

Figure 5:
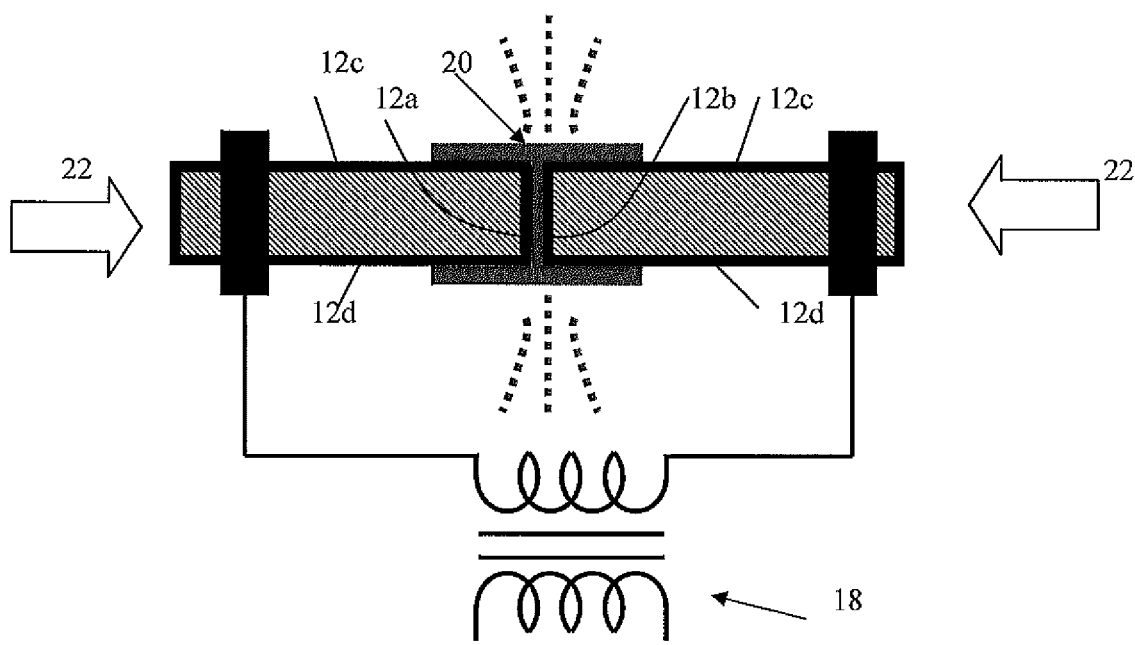
FIG. 5 shows two ends of a bearing component according to an embodiment of the invention being flash butt welded.

FIG. 5 shows the ends 12a, 12b of an open bearing ring 12 being flash butt welded together. The ends 12a, 12b of the open bearing ring 12 are clamped and brought together at a controlled rate and current from a transformer 18 is applied. An arc is created between the two ends 12a, 12b. At the beginning of the flash butt welding process, the arc gap 20 is large enough to even out and clean the two surfaces 12a, 12b.

Figure 6:
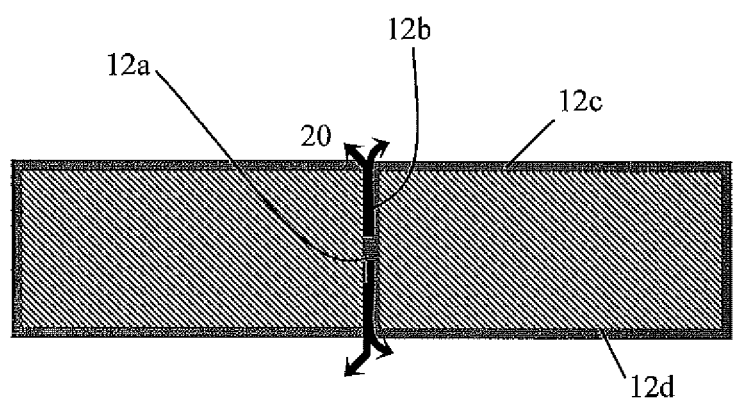
FIG. 6 shows the material flow at the surfaces of a bearing component during flash butt welding.

Reducing and then closing and opening the gap 20 creates heat in the two surfaces 12a, 12b. When the temperature at the two surfaces 12a, 12b has reached the forging temperature, pressure is applied in the directions of arrows 19 in FIG. 3 (or a moveable end is forged against a stationary end). A flash is created between the two surfaces 12a, 12b, which causes material in the welding area to flow radially outwards from the surfaces 12a, 12b towards the inside and outside surfaces 12c, 12d of the bearing ring 12, as indicated by the arrows 24 in FIG. 6, resulting in a clean weld joint.

After cooling in a water-, oil- or polymer-based quench for example, any welding accretion which accumulates on the inner and outer surfaces 12d and 12c of the welded bearing ring 12 may be removed. According to an embodiment of the invention the welded bearing ring may be subjected to a second heat treatment and upsetting force to further improve its structural integrity.

Further modifications of the invention within the scope of the claims will be apparent to a skilled person.

The invention claimed is:

1. A bearing component, comprising:
   first and second ends that are welded together to form a flash butt weld joint,
   wherein the bearing component is made from steel comprising, by weight, max 20 ppm S and max 15 ppm O, and including sulphide inclusions, and wherein less than 5% of the sulphide inclusions contain at least one of encapsulated and embedded oxide inclusions.

2. The bearing component according to claim 1, said sulphide inclusions have a maximum length of 125 µm at a reduced variate equal to 3.

3. The bearing component according to claim 1, wherein said steel comprises a max 10 ppm O.

4. The bearing component according to claim 1, wherein said sulphide inclusions have an aspect ratio less than 3:1.

5. The bearing component according to claim 1, wherein said steel contains between 0.1 to 1.20 weight-% C.

6. The bearing component according to claim 1, wherein said steel contains between 0.15 to 0.40 weight-% C.

7. The bearing component according claim 1, said steel further comprises an element selected from an element group consisting of: Ca, Mg, Te, Ce, Pr, Nd, Pm, Sm, Eu, Gd, Tb, Dy, Ho, Er, Tm, Yb and Lu.

8. The bearing component according to claim 7, wherein said steel comprises, by weight, 10-30 ppm of said element.

9. The bearing component according to claim 1, said bearing component further comprising at least part of a ball bearing.

10. The bearing component according to claim 1, wherein said bearing component is formed into one of a bearing ring or a bearing ring segment.

11. The bearing component according to claim 1, wherein the bearing component comprises at least part of a roller bearing.

12. The bearing component according to claim 11, wherein the roller bearing is selected from the group consisting of a needle bearing, a tapered roller bearing, a spherical roller bearing, and a toroidal roller bearing.

13. The bearing component according to claim 1, wherein the bearing component comprises at least part of a ball thrust bearing.

14. The bearing component according to claim 1, wherein the bearing component comprises at least part of a roller thrust bearing.

15. The bearing component according to claim 1, wherein the bearing component comprises at least part of a tapered roller thrust bearing.

16. The bearing component according to claim 1, wherein the bearing component comprises at least part of a wheel bearing.

17. The bearing component according to claim 1, wherein the bearing component comprises at least part of a hub bearing unit.

18. The bearing component according to claim 1, wherein the bearing component comprises at least part of a slewing bearing.

19. The bearing component according to claim 1, wherein the bearing component comprises at least part of a ball screw.

20. The bearing component according to claim 1, wherein the bearing component is configured to be subjected to alternating Hertzian stresses, including at least one of a rolling contact and a sliding contact.

\* \* \* \* \*